United States Patent
Kim et al.

(10) Patent No.: US 10,575,237 B2
(45) Date of Patent: Feb. 25, 2020

(54) METHOD FOR TRANSMITTING CELL VISITED HISTORY AND WIRELESS EQUIPMENT THEREOF

(71) Applicant: LG ELECTRONICS INC., Seoul (KR)

(72) Inventors: Sangwon Kim, Seoul (KR); Sunghoon Jung, Seoul (KR); Youngdae Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/901,939

(22) PCT Filed: Oct. 22, 2014

(86) PCT No.: PCT/KR2014/009944
§ 371 (c)(1),
(2) Date: Dec. 29, 2015

(87) PCT Pub. No.: WO2015/064952
PCT Pub. Date: May 7, 2015

(65) Prior Publication Data
US 2016/0374000 A1    Dec. 22, 2016

Related U.S. Application Data

(60) Provisional application No. 61/899,151, filed on Nov. 1, 2013.

(51) Int. Cl.
*H04W 48/04*    (2009.01)
*H04W 48/20*    (2009.01)
(Continued)

(52) U.S. Cl.
CPC ....... *H04W 48/04* (2013.01); *H04W 36/0083* (2013.01); *H04W 36/245* (2013.01);
(Continued)

(58) Field of Classification Search
CPC ..................................................... H04W 48/04
(Continued)

(56) References Cited

U.S. PATENT DOCUMENTS

2010/0173626 A1    7/2010    Catovic et al.
2010/0272050 A1    10/2010   Lim et al.
(Continued)

FOREIGN PATENT DOCUMENTS

CN    102090120 A    6/2011
CN    101656941 B    11/2012
(Continued)

OTHER PUBLICATIONS

ITRI, "Providing Mobility Information Upon IDLE to Connected", R2-133106, 3GPP TSG-RAN WG2 Meeting#83bis, Oct. 7-11, 2013, Ljubljana, Slovenia.
(Continued)

*Primary Examiner* — Chuck Huynh
(74) *Attorney, Agent, or Firm* — Dentons US LLP

(57) ABSTRACT

There is provided a method for transmitting an uplink message, the method performed by a user equipment (UE). The method may comprise: receiving, by the UE, a request about a visited cell history; transmitting, by the UE, in response to the request, the visited cell history. Here, the cell visited history may include an identifier of a visited cell, and time information corresponding to the visited cell.

11 Claims, 11 Drawing Sheets

(51) Int. Cl.
*H04W 36/24* (2009.01)
*H04W 36/00* (2009.01)
*H04W 48/08* (2009.01)
*H04W 36/32* (2009.01)
*H04W 84/04* (2009.01)

(52) U.S. Cl.
CPC ........... *H04W 48/08* (2013.01); *H04W 48/20* (2013.01); *H04W 36/32* (2013.01); *H04W 84/042* (2013.01)

(58) Field of Classification Search
USPC ........................................................ 455/434
See application file for complete search history.

(56) References Cited

U.S. PATENT DOCUMENTS

2010/0317349 A1* 12/2010 Serravalle ............. H04W 24/10 455/440
2012/0327797 A1* 12/2012 Siomina ................ H04W 36/30 370/252
2013/0165120 A1 6/2013 Nylander et al.
2016/0345160 A1* 11/2016 Diachina ................. H04W 8/00

FOREIGN PATENT DOCUMENTS

| | | |
|---|---|---|
| CN | 103313316 A | 9/2013 |
| JP | 2011511488 A | 4/2011 |
| JP | 2014525164 A | 9/2014 |
| KR | 10-2010-0118532 A | 11/2010 |
| RU | 2009131685 A | 3/2011 |
| WO | 2008020280 A1 | 2/2008 |
| WO | 2011/021592 A1 | 2/2011 |
| WO | 2012177205 A1 | 12/2012 |
| WO | 2013/147499 A1 | 10/2013 |

OTHER PUBLICATIONS

Media Tek Inc., "Speed dependent mobility," 3GPP TSG-RAN2 #81bis Meeting, Apr. 15-19, 2013, R2-131170.

Media Tek Inc., "Provisioning of mobility info for connection setup," 3GPP TSG-RAN2 #83bis Meeting, Oct. 7-11, 2013, R2-133546.

* cited by examiner

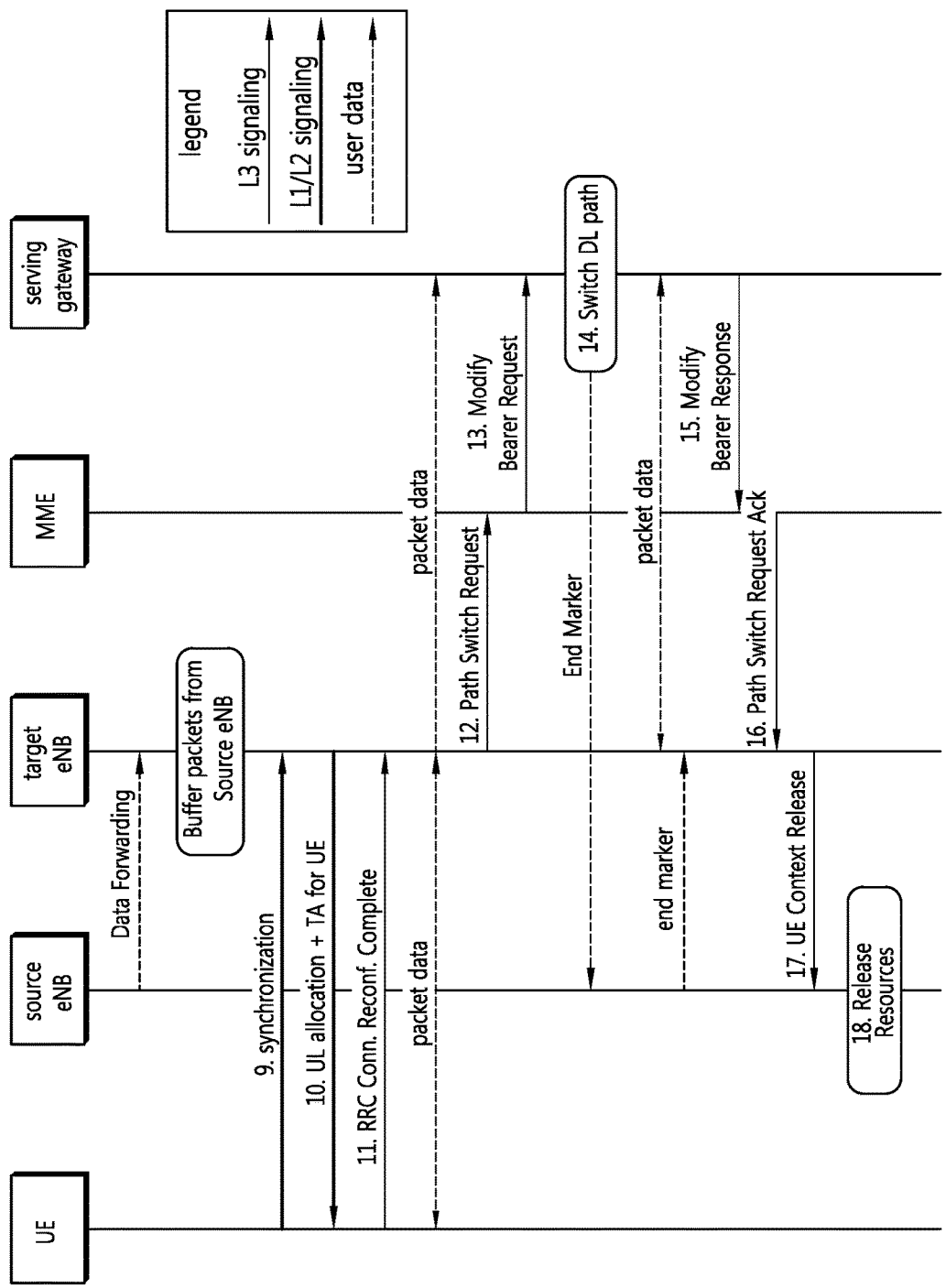

METHOD FOR TRANSMITTING CELL VISITED HISTORY AND WIRELESS EQUIPMENT THEREOF

This application is a National Stage Application of International Application No. PCT/KR2014/009944, filed on Oct. 22, 2014, which claims the benefit of U.S. Provisional Application No. 61/899,151, filed on Nov. 1, 2013, all of which are hereby incorporated by reference in their entirety for all purposes as if fully set forth herein.

FIELD OF THE INVENTION

The present invention relates to wireless communication, and more specifically, to a method for transmitting cell visited history and wireless equipment thereof.

DISCUSSION OF THE RELATED ART

3rd generation partnership project (3GPP) long term evolution (LTE) is an improved version of a universal mobile telecommunication system (UMTS) and is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) that is an evolution of the 3GPP LTE.

In LTE/LTE-A, if the UE moves through the plurality of cells, the UE performs selection/reselection procedures in idle mode or handover procedure in connected mode.

Under this situation, there is a need for the network to estimate a user equipment (UE)'s speed. However, there does not exist any solutions for the network to estimate the UE's speed.

SUMMARY OF THE INVENTION

Therefore, an object of the present invention is to allow the network to estimate the UE's speed.

To achieve these and other advantages and in accordance with the purpose of the present invention, as embodied and broadly described herein, there is provided a solution which allows the UE to log visited cell history that is accumulated information on visited cells and then provide the visited cell history to the network at or after RRC connection setup to help the network estimate the UE's speed. The helpful information may be time information that the UE spent in the visited cell.

In more detail, to achieve these and other advantages and in accordance with the purpose of the present invention, as embodied and broadly described herein, there is provided a method for transmitting an uplink message, the method performed by a user equipment (UE). The method may comprise: receiving, by the UE, a request about a visited cell history; transmitting, by the UE, in response to the request, the visited cell history. Here, the cell visited history may include an identifier of a visited cell, and time information corresponding to the visited cell.

The time information may indicates a time duration that the UE spent in each visited cell identified by the identifier of the visited cell.

The cell identifier includes at least one of a global cell identifier and a physical cell identifier If the UE acquires a global cell identifier, the cell identifier includes the global cell identifier. But, if the UE does not acquire the global cell identifier, the cell identifier includes the physical cell identifier. Also, if the UE does not acquire the global cell identifier, the cell visited history further includes frequency information.

The time information corresponding to the visited cell includes at least one of: time that the UE stayed in the visited cell; time that the UE selected the visited cell by performing a cell re-selection procedure; and time that the UE is handed over to the visited cell by performing handover procedure.

The method may further comprise: accumulating the cell visited history whenever the UE performs a cell reselection procedure or a handover procedure.

The method may further comprise: checking whether the cell visited history is valid or invalid. Accordingly, in the transmitting step, only valid visited cell history may be transmitted.

The UE may consider the visited history is invalid, if the time that the UE stayed in the corresponding cell is less than a first threshold, or if the elapsed time since the UE logged the visited cell information exceeds a second threshold.

To achieve these and other advantages and in accordance with the purpose of the present invention, as embodied and broadly described herein, there is provided a wireless equipment for transmitting an uplink message. The wireless equipment may comprise: a transceiver configured to receive a request about a visited cell history; and a processor configured to control the transceiver to transmit, in response to the request, the visited cell history. Here, the cell visited history includes an identifier of a visited cell, and time information corresponding to the visited cell.

According to the present disclosure, the above-explained problem may be solved.

BRIEF DESCRIPTION OF THE DRAWINGS

FIGS. 7A and 7B show an intra-MME/serving gateway handover procedure.

DETAILED DESCRIPTION OF THE EMBODIMENTS

Figure 1:
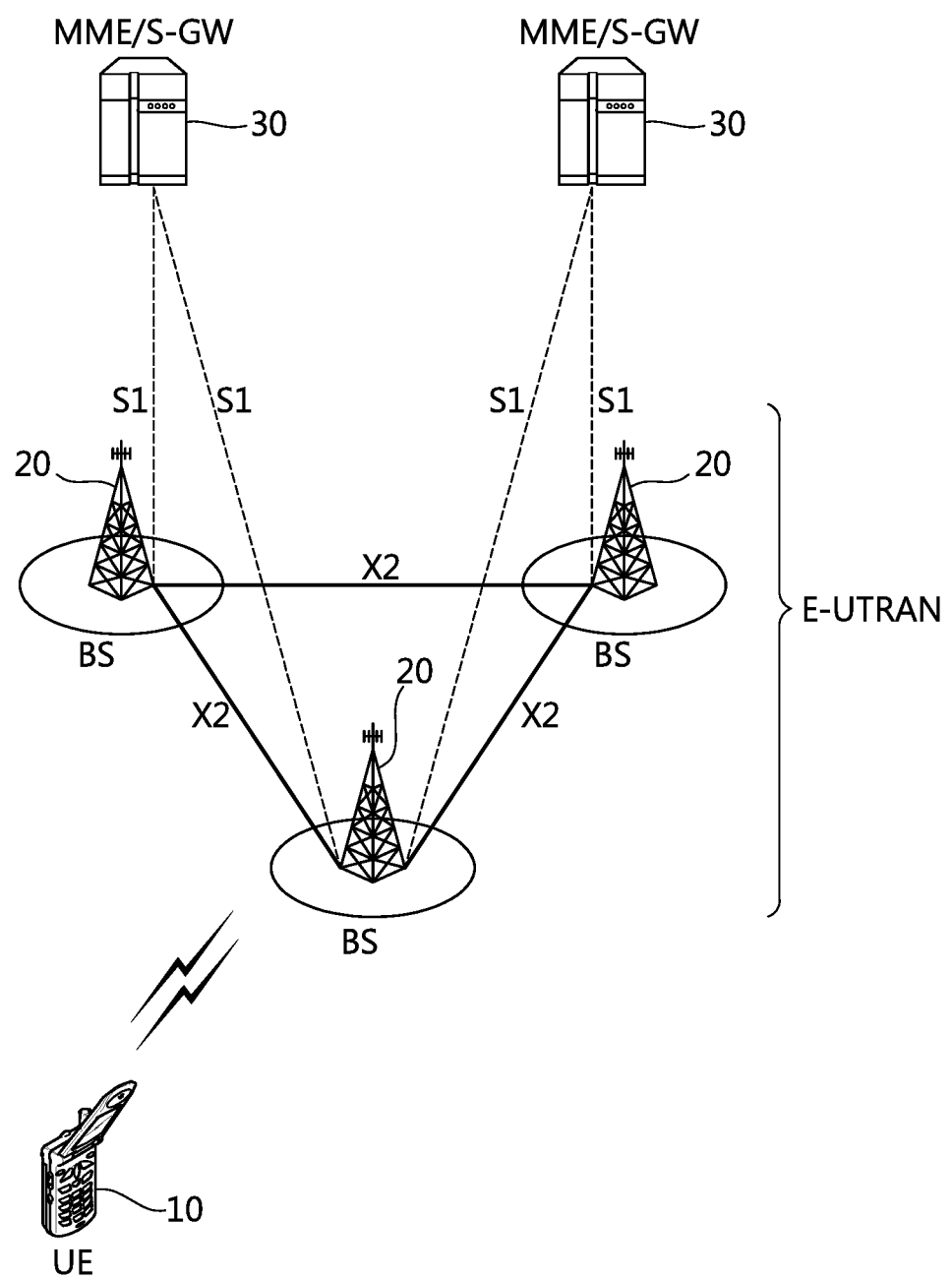
FIG. 1 shows a wireless communication system to which the present invention is applied.

Reference will now be made in detail to the preferred embodiments of the present invention, examples of which are illustrated in the accompanying drawings. It will also be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

Description will now be given in detail of a drain device and a refrigerator having the same according to an embodiment, with reference to the accompanying drawings.

The present invention will be described on the basis of a universal mobile telecommunication system (UMTS) and an evolved packet core (EPC). However, the present invention is not limited to such communication systems, and it may be also applicable to all kinds of communication systems and methods to which the technical spirit of the present invention is applied.

It should be noted that technological terms used herein are merely used to describe a specific embodiment, but not to limit the present invention. Also, unless particularly defined otherwise, technological terms used herein should be construed as a meaning that is generally understood by those having ordinary skill in the art to which the invention pertains, and should not be construed too broadly or too narrowly. Furthermore, if technological terms used herein are wrong terms unable to correctly express the spirit of the invention, then they should be replaced by technological terms that are properly understood by those skilled in the art. In addition, general terms used in this invention should be construed based on the definition of dictionary, or the context, and should not be construed too broadly or too narrowly.

Incidentally, unless clearly used otherwise, expressions in the singular number include a plural meaning. In this application, the terms "comprising" and "including" should not be construed to necessarily include all of the elements or steps disclosed herein, and should be construed not to include some of the elements or steps thereof, or should be construed to further include additional elements or steps.

The terms used herein including an ordinal number such as first, second, etc. can be used to describe various elements, but the elements should not be limited by those terms. The terms are used merely to distinguish an element from the other element. For example, a first element may be named to a second element, and similarly, a second element may be named to a first element.

In case where an element is "connected" or "linked" to the other element, it may be directly connected or linked to the other element, but another element may be existed therebetween. On the contrary, in case where an element is "directly connected" or "directly linked" to another element, it should be understood that any other element is not existed therebetween.

Hereinafter, preferred embodiments of the present invention will be described in detail with reference to the accompanying drawings, and the same or similar elements are designated with the same numeral references regardless of the numerals in the drawings and their redundant description will be omitted. In describing the present invention, moreover, the detailed description will be omitted when a specific description for publicly known technologies to which the invention pertains is judged to obscure the gist of the present invention. Also, it should be noted that the accompanying drawings are merely illustrated to easily explain the spirit of the invention, and therefore, they should not be construed to limit the spirit of the invention by the accompanying drawings. The spirit of the invention should be construed as being extended even to all changes, equivalents, and substitutes other than the accompanying drawings.

There is an exemplary UE (User Equipment) in accompanying drawings, however the UE may be referred to as terms such as a terminal, a mobile equipment (ME), a mobile station (MS), a user terminal (UT), a subscriber station (SS), a wireless device (WD), a handheld device (HD), an access terminal (AT), and etc. And, the UE may be implemented as a portable device such as a notebook, a mobile phone, a PDA, a smart phone, a multimedia device, etc, or as an unportable device such as a PC or a vehicle-mounted device.

FIG. 1 shows a wireless communication system to which the present invention is applied.

The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNodeB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
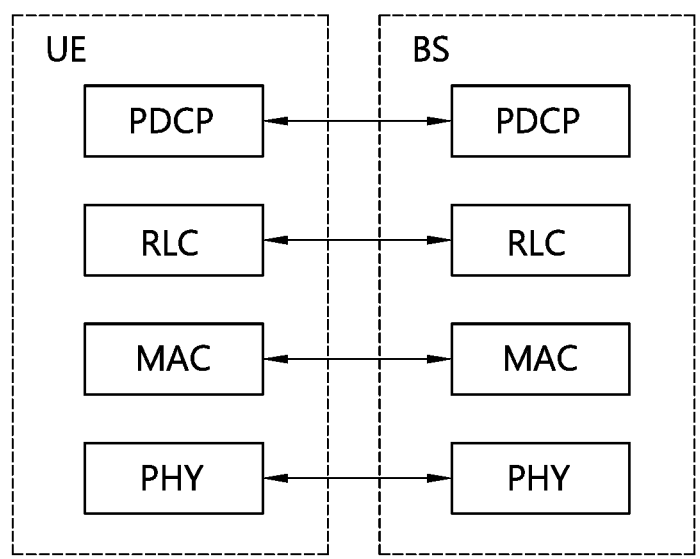
FIG. 2 is a diagram showing a radio protocol architecture for a user plane.
Figure 3:
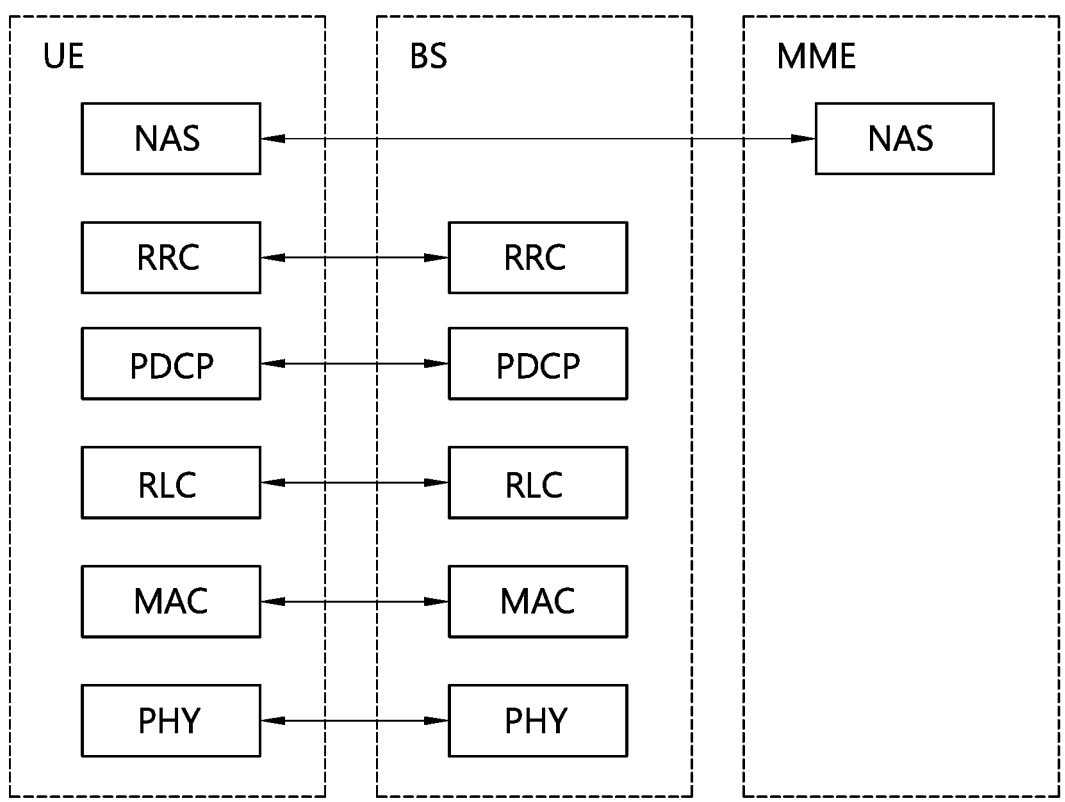
FIG. 3 is a diagram showing a radio protocol architecture for a control plane.

FIG. 2 is a diagram showing a radio protocol architecture for a user plane. FIG. 3 is a diagram showing a radio protocol architecture for a control plane.

The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Between different PHY layers, i.e., a PHY layer of a transmitter and a PHY layer of a receiver, data is transferred through the physical channel. The physical channel may be modulated using an orthogonal frequency division multiplexing (OFDM) scheme, and may utilize time and frequency as a radio resource.

Functions of the MAC layer include mapping between a logical channel and a transport channel and multiplexing/de-multiplexing on a transport block provided to a physical channel over a transport channel of a MAC service data unit (SDU) belonging to the logical channel. The MAC layer provides a service to a radio link control (RLC) layer through the logical channel.

Functions of the RLC layer include RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

Functions of a packet data convergence protocol (PDCP) layer in the user plane include user data delivery, header compression, and ciphering. Functions of a PDCP layer in the control plane include control-plane data delivery and ciphering/integrity protection.

A radio resource control (RRC) layer is defined only in the control plane. The RRC layer serves to control the logical channel, the transport channel, and the physical channel in association with configuration, reconfiguration and release of radio bearers (RBs). An RB is a logical path provided by the first layer (i.e., the PHY layer) and the second layer (i.e., the MAC layer, the RLC layer, and the PDCP layer) for data delivery between the UE and the network.

The setup of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the network, the UE is in an RRC connected state (also may be referred as an RRC connected mode), and otherwise the UE is in an RRC idle state (also may be referred as an RRC idle mode).

Data is transmitted from the network to the UE through a downlink transport channel. Examples of the downlink transport channel include a broadcast channel (BCH) for transmitting system information and a downlink-shared channel (SCH) for transmitting user traffic or control messages. The user traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several subcarriers in a frequency domain. One subframe includes a plurality of OFDM symbols in the time domain. A resource block is a resource allocation unit, and includes a plurality of OFDM symbols and a plurality of subcarriers. Further, each subframe may use particular subcarriers of particular OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Hereinafter, an RRC state of a UE and an RRC connection mechanism will be described.

The RRC state indicates whether an RRC layer of the UE is logically connected to an RRC layer of an E-UTRAN. If the two layers are connected to each other, it is called an RRC connected state, and if the two layers are not connected to each other, it is called an RRC idle state. When in the RRC connected state, the UE has an RRC connection and thus the E-UTRAN can recognize a presence of the UE in a cell unit. Accordingly, the UE can be effectively controlled. On the other hand, when in the RRC idle state, the UE cannot be recognized by the E-UTRAN, and is managed by a core network in a tracking area unit which is a unit of a wider area than a cell. That is, regarding the UE in the RRC idle state, only a presence or absence of the UE is recognized in a wide area unit. To get a typical mobile communication service such as voice or data, a transition to the RRC connected state is necessary.

When a user initially powers on the UE, the UE first searches for a proper cell and thereafter stays in the RRC idle state in the cell. Only when there is a need to establish an RRC connection, the UE staying in the RRC idle state establishes the RRC connection with the E-UTRAN through an RRC connection procedure and then transitions to the RRC connected state. Examples of a case where the UE in the RRC idle state needs to establish the RRC connection are various, such as a case where uplink data transmission is necessary due to telephony attempt of the user or the like or a case where a response message is transmitted in response to a paging message received from the E-UTRAN.

A non-access stratum (NAS) layer belongs to an upper layer of the RRC layer and serves to perform session management, mobility management, or the like.

Now, a radio link failure will be described.

A UE persistently performs measurement to maintain quality of a radio link with a serving cell from which the UE receives a service. The UE determines whether communication is impossible in a current situation due to deterioration of the quality of the radio link with the serving cell. If it is determined that the quality of the serving cell is so poor that communication is almost impossible, the UE determines the current situation as a radio link failure.

If the radio link failure is determined, the UE gives up maintaining communication with the current serving cell, selects a new cell through a cell selection (or cell reselection) procedure, and attempts RRC connection re-establishment to the new cell.

Figure 4:
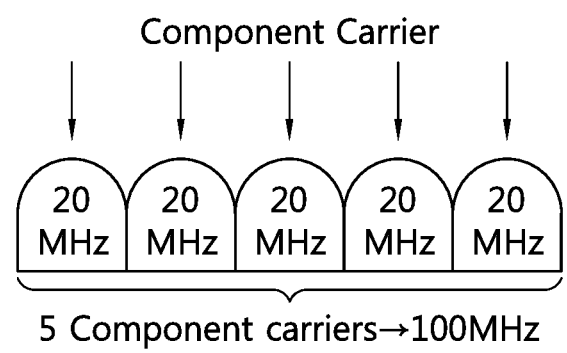
FIG. 4 shows an example of a wideband system using carrier aggregation for 3GPP LTE-A.

FIG. 4 shows an example of a wideband system using carrier aggregation for 3GPP LTE-A.

Component carrier (CC) means the carrier used in then carrier aggregation system and may be briefly referred as carrier.

Referring to FIG. 4, each component carrier (CC) has a bandwidth of 20 MHz, which is a bandwidth of the 3GPP LTE. Up to 5 CCs may be aggregated, so maximum bandwidth of 100 MHz may be configured.

Carrier aggregation systems may be classified into a contiguous carrier aggregation system in which aggregated carriers are contiguous and a non-contiguous carrier aggregation system in which aggregated carriers are spaced apart from each other. Hereinafter, when simply referring to a carrier aggregation system, it should be understood as including both the case where the component carrier is contiguous and the case where the control channel is non-contiguous.

When one or more component carriers are aggregated, the component carriers may use the bandwidth adopted in the existing system for backward compatibility with the existing system. For example, the 3GPP LTE system supports bandwidths of 1.4 MHz, 3 MHz, 5 MHz, 10 MHz, 15 MHz and 20 MHz, and the 3GPP LTE-A system may configure a broad band of 20 MHz or more only using the bandwidths of the 3GPP LTE system. Or, rather than using the bandwidths of the existing system, new bandwidths may be defined to configure a wide band.

The system frequency band of a wireless communication system is separated into a plurality of carrier frequencies. Here, the carrier frequency means the cell frequency of a cell. Hereinafter, the cell may mean a downlink frequency resource and an uplink frequency resource. Or, the cell may refer to a combination of a downlink frequency resource and an optional uplink frequency resource. Further, in the general case where carrier aggregation (CA) is not in consideration, one cell may always have a pair of a uplink frequency resource and a downlink frequency resource.

Cells may be classified into primary cells and secondary cells, serving cells.

The primary cell means a cell operating at a primary frequency. The primary cell is a cell where the terminal conducts an initial connection establishment procedure or connection re-establishment procedure with the base station or is a cell designated as a primary cell during the course of handover.

The secondary cell means a cell operating at a secondary frequency. The secondary cell is configured once an RRC connection is established and is used to provide an additional radio resource.

The serving cell is configured as a primary cell in case no carrier aggregation is configured or when the terminal cannot offer carrier aggregation. In case carrier aggregation is configured, the term "serving cell" denotes a cell configured to the terminal and a plurality of serving cells may be included. One serving cell may consist of one downlink component carrier or a pair of {downlink component carrier, uplink component carrier}. A plurality of serving cells may consist of a primary cell and one or more of all the secondary cells.

The PCC (primary component carrier) means a component carrier (CC) corresponding to the primary cell. The PCC is, among several CCs, the one where the terminal initially achieves connection or RRC connection with the base station. The PCC is a special CC that is in charge of connection or RRC connection for signaling regarding multiple CCs and manages terminal context information (UE context) that is connection information related with the terminal. Further, the PCC achieves connection with the terminal, so that the PCC is always left in the activation state when in RRC connected mode. The downlink component carrier corresponding to the primary cell is denoted downlink primary component carrier (DL PCC) and the uplink component carrier corresponding to the primary cell is denoted uplink primary component carrier (UL PCC).

The SCC (secondary component carrier) means a CC corresponding to a secondary cell. That is, the SCC is a CC other than the PCC, which is assigned to the terminal and is an extended carrier for the terminal to perform additional resource allocation in addition to the PCC. The SCC may be left in activation state or deactivation state. The downlink component carrier corresponding to the secondary cell is denoted downlink secondary component carrier (DL SCC) and the uplink component carrier corresponding to the secondary cell is denoted uplink secondary component carrier (UL SCC).

The primary cell and the secondary cell have the following characteristics.

First, the primary cell is used for transmitting a PUCCH. Second, the primary cell is always left activated while the secondary cell may be activated/deactivated depending on a specific condition. Third, when the primary cell experiences a radio link failure (hereinafter, 'RLF'), RRC re-connection is triggered. Fourth, the primary cell may be varied by a handover procedure that comes with an RACH (random access channel) procedure or by altering a security key. Fifth, NAS (non-access stratum) information is received through the primary cell. Sixth, in the FDD system, the primary cell has always a pair of a DL PCC and a UL PCC. Seventh, a different component carrier (CC) may be set as a primary cell in each terminal. Eighth, the primary cell may be replaced only through a handover or cell selection/cell re-selection procedure. In adding a new serving cell, RRC signaling may be used to transmit system information of a dedicated serving cell.

When configuring a serving cell, a downlink component carrier may form one serving cell or a downlink component carrier and an uplink component carrier form a connection to thereby configure one serving cell. However, a serving cell is not configured with one uplink component carrier alone.

Activation/deactivation of a component carrier is equivalent in concept to activation/deactivation of a serving cell. For example, assuming that serving cell 1 is constituted of DL CC1, activation of serving cell 1 means activation of DL CC1. If serving cell2 is configured by connection of DL CC2 and UL CC2, activation of serving cell2 means activation of DL CC2 and UL CC2. In this sense, each component carrier may correspond to a serving cell.

Figure 5:
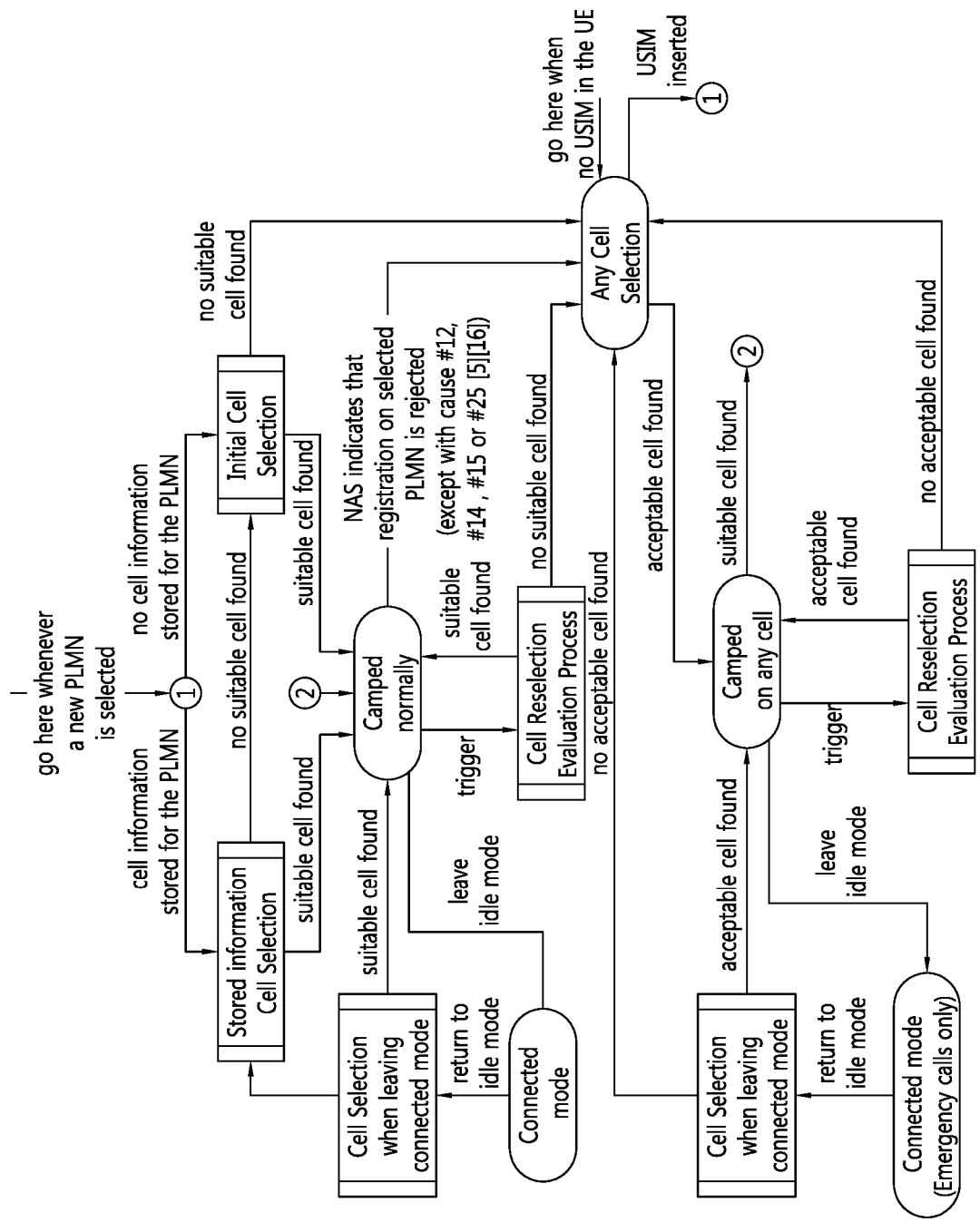
FIG. 5 shows the states and state transitions and procedures in RRC_IDLE.

FIG. 5 shows the states and state transitions and procedures in RRC_IDLE.

The UE shall perform measurements for cell selection and reselection purposes. The NAS can control the RAT(s) in which the cell selection should be performed, for instance by indicating RAT(s) associated with the selected PLMN, and by maintaining a list of forbidden registration area(s) and a list of equivalent PLMNs. The UE selects a suitable cell based on idle mode measurements and cell selection criteria.

In order to speed up the cell selection process, stored information for several RATs may be available in the UE.

When camped on a cell, the UE may regularly search for a better cell according to the cell reselection criteria. If a better cell is found, that cell is selected. The change of cell may imply a change of RAT. Details on performance requirements for cell reselection can be found in [10].

The NAS is informed if the cell selection and reselection results in changes in the received system information relevant for NAS.

For normal service, the UE may camp on a suitable cell, tune to that cell's control channel(s) so that the UE can:
  receive system information from the PLMN; and
  receive registration area information from the PLMN, e.g., tracking area information; and
  receive other AS and NAS Information; and
  if registered:
    receive paging and notification messages from the PLMN; and
    initiate transfer to connected mode.

Meanwhile, referring to FIG. 5, whenever a new PLMN selection is performed, it causes an exit to number 1.

Figure 6:
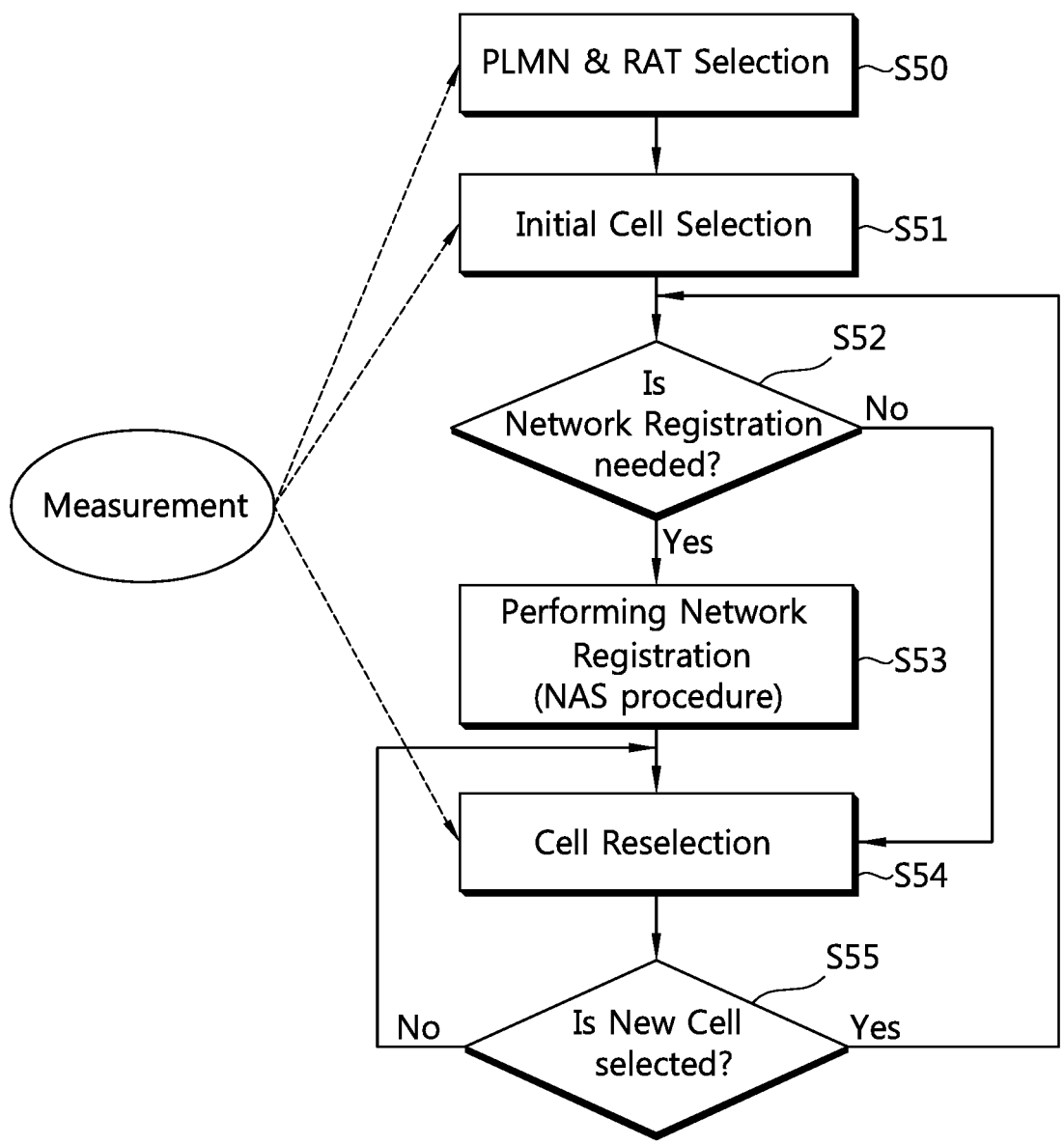
FIG. 6 shows an example of an operation of a UE in an RRC_IDLE.

FIG. 6 shows an example of an operation of a UE in an RRC_IDLE.

It is illustrated in FIG. 6 that a procedure of registering a network through a cell selection and performing a cell reselection if needed after the UE is initially turned on.

Referring the FIG. 6, a UE selects a radio access technology (RAT) for communicating with a PLMN from which the UE intends to be served at step S50. Information about the PLMN and the RAT may be selected by the UE. The UE may use information stored in a universal subscriber identity module (USIM).

The UE selects a highest cell among a measured BS and cells having higher quality than a predetermined value at step S51. This procedure is referred as an initial cell selection procedure, and performed by a UE turned on. The cell selection procedure will be described in the following. After the cell selection, the UE periodically receives system information from the BS. The predetermined value is a value defined in a communication system for ensuring a physical signal quality in data transmission/reception. Therefore, the predetermined value may vary with a RAT to which the each predetermined value is applied.

The UE determines whether to perform a network registration procedure at step S52. The UE performs a network registration procedure if needed at step S53. The UE registers self information (i.e. IMSI) for being served by the network (i.e. paging). The UE does not register whenever the UE selects a cell. When the UE's own information about the network, e.g., a tracking area identity (TAI), is different from information about the network provided from the system information, the UE performs the network registration procedure.

If a value of signal strength or signal quality measured from a BS serving the UE is lower than a value measured from a BS of neighbor cell, the UE may select one of other cells providing a better signal characteristic than the BS serving the UE. This procedure is referred as a cell reselection procedure, which is distinguished from the initial cell selection procedure. There may be a temporal constraint for preventing the UE from performing the cell reselection procedure frequently according to a change of a signal characteristic. The cell reselection procedure will be described in the following.

The UE performs a cell reselection procedure at step S54. The cell reselection procedure will be described below. If the new cell is selected, the UE may perform procedures described in step S52. If the new cell is not selected, the UE may perform the cell reselection procedure again.

A cell selection procedure is described in detail.

If a UE is turned on or is camped on a cell, the UE may perform procedures in order to receive a service by selecting a cell having suitable quality.

The UE in an RRC_IDLE needs to be ready to receive the service through the cell by selecting the cell having suitable quality all the time. For example, the UE that has been just turned on must select the cell having suitable quality so as to be registered into a network. If the UE that has stayed in an RRC_CONNECTED enters into the RRC_IDLE, the UE must select a cell on which the UE itself is camped. As such, a procedure of selecting a cell satisfying a certain condition by the UE in order to stay in a service waiting state such as the RRC_IDLE is called a cell selection. The cell selection is performed in a state that the UE does not currently determine a cell on which the UE itself is camped in the RRC_IDLE, and thus it is very important to select the cell as quickly as possible. Therefore, if a cell provides radio signal quality greater than or equal to a predetermined level, the cell may be selected in the cell selection procedure even though the cell is not a cell providing best radio signal quality.

Hereinafter, a method and procedure for selecting a cell by a UE in 3GPP LTE is described in detail. If power is initially turned on, the UE searches for available PLMNs and selects a suitable PLMN to receive a service. Subsequently, the UE selects a cell having a signal quality and property capable of receiving a suitable service among the cells provided by the selected PLMN.

The UE may use one of the following two cell selection procedures:

1) Initial cell selection: This procedure requires no prior knowledge of which RF channels are E-UTRA carriers. The UE may scan all RF channels in the E-UTRA bands according to its capabilities to find a suitable cell. On each carrier frequency, the UE need only search for the strongest cell. Once a suitable cell is found, this cell may be selected.

2) Stored information cell selection: This procedure requires stored information of carrier frequencies and optionally also information on cell parameters, from previously received measurement control information elements or from previously detected cells. Once the UE has found a suitable cell, the UE may select it. If no suitable cell is found, the initial cell selection procedure may be started.

The cell selection criteria S used by the UE in the cell selection process may be represented as follows:

$$Srxlev>0 \text{ AND } Squal>0 \quad \text{[Equation 1]}$$

where: $Srxlev = Q_{rxlevmeas} - (Q_{rxlevmin} + Q_{rxlevminoffset}) - Pcompensation$ $Squal = Q_{qualmeas} - (Q_{qualmin} + Q_{qualminoffset})$

TABLE 1

| | |
|---|---|
| Srxlev | Cell selection RX level value (dB) |
| Squal | Cell selection quality value (dB) |
| $Q_{rxlevmeas}$ | Measured cell RX level value (RSRP) |
| $Q_{qualmeas}$ | Measured cell quality value (RSRQ) |
| $Q_{rxlevmin}$ | Minimum required RX level in the cell (dBm) |
| $Q_{qualmin}$ | Minimum required quality level in the cell (dB) |
| $Q_{rxlevminoffset}$ | Offset to the signalled $Q_{rxlevmin}$ taken into account in the Srxlev evaluation as a result of a periodic search for a higher priority PLMN while camped normally in a VPLMN [5] |
| $Q_{qualminoffset}$ | Offset to the signalled $Q_{qualmin}$ taken into account in the Squal evaluation as a result of a periodic search for a higher priority PLMN while camped normally in a VPLMN [5] |
| Pcompensation | max($P_{EMAX} - P_{PowerClass}$, 0) (dB) |
| $P_{EMAX}$ | Maximum TX power level an UE may use when transmitting on the uplink in the cell (dBm) defined as $P_{EMAX}$ in [TS 36.101] |
| $P_{PowerClass}$ | Maximum RF output power of the UE (dBm) according to the UE power class as defined in [TS 36.101] |

The signaled values $Q_{rxlevminoffset}$ and $Q_{qualminoffset}$ are only applied when a cell is evaluated for cell selection as a result of a periodic search for a higher priority PLMN while camped normally in a VPLMN. During this periodic search for higher priority PLMN the UE may check the S criteria of a cell using parameter values stored from a different cell of this higher priority PLMN.

A cell reselection procedure is described in detail.

After a UE selects a certain cell through a cell selection procedure, the signal strength and quality between the UE and a BS may be changed due to a change of the UE mobility and wireless environment. Therefore, if the quality of the selected cell deteriorates, the UE may select another cell providing better quality. If a cell is reselected in this manner, a cell providing signal quality better than that of the currently selected cell is selected in general. This procedure is called a cell reselection. A basic purpose of the cell reselection procedure is generally to select a cell providing best quality to the UE from the perspective of the radio signal quality.

In addition to the perspective of the radio signal quality, the network may notify the UE of a priority determined for each frequency. The UE that has received the priority may consider this priority more preferentially than the radio signal quality criteria during the cell reselection procedure.

As described above, there is a method of selecting or reselecting a cell based on the signal property of the wireless environment. When a cell is reselected in the cell reselection procedure, there may be cell reselection methods as described below, based on the RAT and frequency characteristics of the cell.

Intra-frequency cell reselection: A reselected cell is a cell having the same center-frequency and the same RAT as those used in a cell on which the UE is currently being camped.

Inter-frequency cell reselection: A reselected cell is a cell having the same RAT and a different center-frequency with respect to those used in the cell on which the UE is currently being camped.

Inter-RAT cell reselection: A reselected cell is a cell using a different RAT from a RAT used in the cell on which the UE is currently being camped.

Generally, the cell reselection procedure is as follows.

1) The UE receives parameters for the cell reselection procedure from the BS.

2) The UE measures quality of a serving cell and a neighboring cell for a cell reselection.

3) The cell reselection procedure is performed based on cell reselection criteria. The cell reselection criteria have following characteristics with regard to the measurement of serving cells and neighboring cells.

The intra-frequency cell reselection is basically based on ranking. The ranking is an operation for defining a criterion value for evaluation of the cell reselection and for ordering cells according to a magnitude of the criterion value by using the criterion value. A cell having the highest criterion is referred to as a best-ranked cell. The cell criterion value is a value to which a frequency offset or a cell offset is optionally applied on the basis of a value measured by the UE for a corresponding cell.

The inter-frequency cell reselection is based on a frequency priority provided by the network. The UE attempts to camp on at a frequency having the highest priority. The network may provide the same frequency priority to be commonly applied to UEs in a cell by using broadcast signaling or may provide a frequency-specific priority to each UE by using dedicated signaling for each UE. The cell reselection priority provided by the broadcast signaling may be referred to as a common priority. The cell reselection priority to which the network assigns for each UE may be referred to as a dedicated priority. When the UE receives the dedicated priority, the UE also receives a validity time of the dedicated priority together. Upon receiving the dedicated priority, the UE starts a validity timer set to the received validity time. While the validity timer operates, the UE applies the dedicated priority in the RRC_IDLE. When the validity timer expires, the UE deletes the dedicated priority, and accordingly, applies to the common priority.

For the inter-frequency cell reselection, the network may provide parameters (e.g., frequency-specific offsets) for use in cell reselection to the UE for each frequency.

For the intra-frequency cell reselection or the inter-frequency cell reselection, the network may provide a neighboring cell list (NCL) for use in the cell reselection to the UE. The NCL includes cell-specific parameters (e.g. cell-specific offsets) used in the cell reselection.

For the intra-frequency or inter-frequency cell reselection, the network may provide the UE with a black list, i.e., a list of cells not to be selected in the cell reselection. The UE does not perform the cell reselection on cells included in the black list.

A reselection priorities handling is described. It may refer to a section 5.2.4.1 of 3GPP TS 36.304 V10.5.0 (2012-03).

Absolute priorities of different E-UTRAN frequencies or inter-RAT frequencies may be provided to the UE in the system information, in the RRCConnectionRelease message, or by inheriting from another RAT at inter-RAT cell (re)selection. In the case of system information, an E-UTRAN frequency or inter-RAT frequency may be listed without providing a priority (i.e. the field cellReselectionPriority is absent for that frequency). If priorities are provided in dedicated signaling, the UE may ignore all the priorities provided in the system information. If UE is in "camped on any cell" state, the UE may only apply the priorities provided by the system information from current cell, and the UE preserves priorities provided by dedicated signaling unless specified otherwise. When the UE in "camped normally" state, has only dedicated priorities other than for the current frequency, the UE may consider the current frequency to be the lowest priority frequency (i.e. lower than the eight network configured values). While the UE is camped on a suitable CSG cell, the UE may always consider the current frequency to be the highest priority frequency (i.e. higher than the eight network configured values), irrespective of any other priority value allocated to this frequency. If the UE has knowledge on which frequency a multimedia broadcast multicast service (MBMS) service of interest is provided, it may consider that frequency to be the highest priority during the MBMS session. The UE may delete priorities provided by dedicated signaling when:

the UE enters RRC_CONNECTED state; or the optional validity time of dedicated priorities (T320) expires; or a PLMN selection is performed on request by NAS.

The UE may only perform cell reselection evaluation for E-UTRAN frequencies and inter-RAT frequencies that are given in the system information and for which the UE has a priority provided. The UE may not consider any black listed cells as candidate for cell reselection. The UE may inherit the priorities provided by dedicated signaling and the remaining validity time (i.e., T320 in E-UTRA, T322 in UTRA and T3230 in GERAN), if configured, at inter-RAT cell (re)selection.

Hereinafter, measurement rules for cell re-selection will be described.

When evaluating Srxlev and Squal of non-serving cells for reselection purposes, the UE shall use parameters provided by the serving cell.

Following rules are used by the UE to limit needed measurements:

If the serving cell fulfils Srxlev>$S_{IntraSearchP}$ and Squal>$S_{IntraSearchQ}$, the UE may choose not to perform intra-frequency measurements.

Otherwise, the UE shall perform intra-frequency measurements.

The UE shall apply the following rules for E-UTRAN inter-frequencies and inter-RAT frequencies which are indicated in system information and for which the UE has priority provided as defined in 5.2.4.1:

For an E-UTRAN inter-frequency or inter-RAT frequency with a reselection priority higher than the reselection priority of the current E-UTRA frequency the UE shall perform measurements of higher priority E-UTRAN inter-frequency or inter-RAT frequencies.

For an E-UTRAN inter-frequency with an equal or lower reselection priority than the reselection priority of the current E-UTRA frequency and for inter-RAT frequency with lower reselection priority than the reselection priority of the current E-UTRAN frequency:

If the serving cell fulfils Srxlev>$S_{nonIntraSearchP}$ and Squal>$S_{nonIntraSearchQ}$, the UE may choose not to perform measurements of E-UTRAN inter-frequencies or inter-RAT frequency cells of equal or lower priority.

Otherwise, the UE shall perform measurements of E-UTRAN inter-frequencies or inter-RAT frequency cells of equal or lower priority according to [10].

Now, mobility states of UE will be described.

Besides Normal-mobility state a High-mobility and a Medium-mobility state are applicable if the parameters ($T_{CRmax}$, $N_{CR\_H}$, $N_{CR\_M}$ and $T_{CRmaxHyst}$) are sent in the system information broadcast of the serving cell.

State detection criteria includes a medium-mobility state criteria and a high-mobility state criteria.

The medium-mobility state criteria:
If number of cell reselections during time period $T_{CRmax}$ exceeds $N_{CR\_M}$ and not exceeds $N_{CR\_H}$ The high-mobility state criteria:
If number of cell reselections during time period $T_{CRmax}$ exceeds $N_{CR\_H}$ The UE shall not count consecutive reselections between same two cells into mobility state detection criteria if same cell is reselected just after one other reselection.

On state transitions, The UE shall:
if the criteria for High-mobility state is detected:
enter High-mobility state.
else if the criteria for Medium-mobility state is detected:
enter Medium-mobility state.
else if criteria for either Medium- or High-mobility state is not detected during time period $T_{CRmaxHyst}$:
enter Normal-mobility state.

If the UE is in High- or Medium-mobility state, the UE shall apply the speed dependent scaling rules.

The UE shall apply the following scaling rules:
If neither Medium- nor Highmobility state is detected: no scaling is applied.
If High-mobility state is detected:
Add the sf-High of "Speed dependent ScalingFactor for $Q_{hyst}$" to $Q_{hyst}$ if sent on system information
For E-UTRAN cells multiply $Treselection_{EUTRA}$ by the sf-High of "Speed dependent ScalingFactor for $Treselection_{EUTRA}$" if sent on system information
For UTRAN cells multiply $Treselection_{UTRA}$ by the sf-High of "Speed dependent ScalingFactor for $Treselection_{UTRA}$" if sent on system information
For GERAN cells multiply $Treselection_{GERA}$ by the sf-High of "Speed dependent ScalingFactor for $Treselection_{GERA}$ state" if sent on system information
For CDMA2000 HRPD cells Multiply $Treselection_{CDMA\_HRPD}$ by the sf-High of "Speed dependent ScalingFactor for $Treselection_{CDMA\_HRPD}$" if sent on system information
For CDMA2000 1×RTT cells Multiply $Treselection_{CDMA\_1\times RTT}$ by the sf-High of "Speed dependent ScalingFactor for $Treselection_{CDMA\_1\times RTT}$" if sent on system information If Medium-mobility state is detected:
Add the sf-Medium of "Speed dependent ScalingFactor for $Q_{hyst}$ for medium mobility state" to $Q_{hyst}$ if sent on system information
For E-UTRAN cells multiply $Treselection_{EUTRA}$ by the sf-Medium of "Speed dependent ScalingFactor for $Treselection_{EUTRA}$" if sent on system information
For UTRAN cells multiply $Treselection_{UTRA}$ by the sf-Medium of "Speed dependent ScalingFactor for $Treselection_{UTRA}$" if sent on system information
For GERAN cells multiply $Treselection_{GERA}$ by the sf-Medium of "Speed dependent ScalingFactor for $Treselection_{GERA}$" if sent on system information
For CDMA2000 HRPD cells Multiply $Treselection_{CDMA\_HRPD}$ by the sf-Medium of "Speed dependent ScalingFactor for $Treselection_{CDMA\_HRPD}$" if sent on system information
For CDMA2000 1×RTT cells Multiply $Treselection_{CDMA\_1\times RTT}$ by the sf-Medium of "Speed dependent ScalingFactor for $Treselection_{CDMA\_1\times RTT}$" if sent on system information In case scaling is applied to any $Treselection_{RAT}$ parameter the UE shall round up the result after all scalings to the nearest second.

Now, cells with cell reservations, access restrictions or unsuitable for normal camping will be discussed.

For the highest ranked cell (including serving cell) according to cell reselection criteria for the best cell according to absolute priority reselection criteria, the UE shall check if the access is restricted according to the rules.

If that cell and other cells have to be excluded from the candidate list, the UE shall not consider these as candidates for cell reselection. This limitation shall be removed when the highest ranked cell changes.

If the highest ranked cell or best cell according to absolute priority reselection rules is an intra-frequency or inter-frequency cell which is not suitable due to being part of the "list of forbidden TAs for roaming" or belonging to a PLMN which is not indicated as being equivalent to the registered PLMN, the UE shall not consider this cell and other cells on the same frequency, as candidates for reselection for a maximum of 300 s. If the UE enters into state any cell selection, any limitation shall be removed. If the UE is redirected under E-UTRAN control to a frequency for which the timer is running, any limitation on that frequency shall be removed.

If the highest ranked cell or best cell according to absolute priority reselection rules is an inter-RAT cell which is not suitable due to being part of the "list of forbidden TAs for roaming" or belonging to a PLMN which is not indicated as being equivalent to the registered PLMN, the UE shall not consider this cell as a candidate for reselection for a maximum of 300 s. In case of UTRA further requirements are defined in the [8]. If the UE enters into state any cell selection, any limitation shall be removed. If the UE is redirected under E-UTRAN control to a frequency for which the timer is running, any limitation on that frequency shall be removed.

If the highest ranked cell or best cell according to absolute priority reselection rules is a CSG cell which is not suitable due to the CSG ID and associated PLMN identity not being present in the CSG whitelist of the UE, the UE shall not consider this cell as candidate for cell reselection but shall continue considering other cells on the same frequency for cell reselection.

Now, E-UTRAN Inter-frequency and inter-RAT Cell Reselection criteria will be explained.

If threshServingLowQ is provided in SystemInformationBlockType3, cell reselection to a cell on a higher priority E-UTRAN frequency or inter-RAT frequency than the serving frequency shall be performed if:

A cell of a higher priority EUTRAN or UTRAN FDD RAT/frequency fulfils Squal>$Thresh_{X,\ HighQ}$ during a time interval $Treselection_{RAT}$; or A cell of a higher priority UTRAN TDD, GERAN or CDMA2000 RAT/frequency fulfils Srxlev>$Thresh_{X,\ HighP}$ during a time interval $Treselection_{RAT}$; and More than 1 second has elapsed since the UE camped on the current serving cell.

Otherwise, cell reselection to a cell on a higher priority E-UTRAN frequency or inter-RAT frequency than the serving frequency shall be performed if:

A cell of a higher priority RAT/frequency fulfils Srxlev>$Thresh_{X,\ HighP}$ during a time interval $Treselection_{RAT}$; and More than 1 second has elapsed since the UE camped on the current serving cell.

Cell reselection to a cell on an equal priority E-UTRAN frequency shall be based on ranking for Intra-frequency cell reselection.

If threshServingLowQ is provided in SystemInformationBlockType3, cell reselection to a cell on a lower priority E-UTRAN frequency or inter-RAT frequency than the serving frequency shall be performed if:

The serving cell fulfils Squal<$Thresh_{Serving,\ LowQ}$ and a cell of a lower priority EUTRAN or UTRAN FDD RAT/frequency fulfils Squal>$Thresh_{X,\ LowQ}$ during a time interval $Treselection_{RAT}$; or The serving cell fulfils Squal<$Thresh_{Serving,\ LowQ}$ and a cell of a lower priority UTRAN TDD, GERAN or CDMA2000 RAT/frequency fulfils Srxlev>$Thresh_{X,\ LowP}$ during a time interval $Treselection_{RAT}$; and More than 1 second has elapsed since the UE camped on the current serving cell.

Otherwise, cell reselection to a cell on a lower priority E-UTRAN frequency or inter-RAT frequency than the serving frequency shall be performed if:

The serving cell fulfils Srxlev<$Thresh_{Serving,\ LowP}$ and a cell of a lower priority RAT/frequency fulfils Srxlev>$Thresh_{X,\ LowP}$ during a time interval $Treselection_{RAT}$; and More than 1 second has elapsed since the UE camped on the current serving cell.

Cell reselection to a higher priority RAT/frequency shall take precedence over a lower priority RAT/frequency, if multiple cells of different priorities fulfil the cell reselection criteria.

For cdma2000 RATs, Srxlev is equal to −FLOOR(−2× 10×log 10 Ec/Io) in units of 0.5 dB, as defined in [18], with Ec/Io referring to the value measured from the evaluated cell.

For cdma2000 RATs, $Thresh_{X,\ HighP}$ and $Thresh_{X,\ LowP}$ are equal to −1 times the values signalled for the corresponding parameters in the system information.

In all the above criteria the value of $Treselection_{RAT}$ is scaled when the UE is in the medium or high mobility state as defined in subclause 5.2.4.3.1. If more than one cell meets the above criteria, the UE shall reselect a cell as follows:

If the highest-priority frequency is an E-UTRAN frequency, a cell ranked as the best cell among the cells on the highest priority frequency(ies) meeting the criteria;

If the highest-priority frequency is from another RAT, a cell ranked as the best cell among the cells on the highest priority frequency(ies) meeting the criteria of that RAT.

Cell reselection to another RAT, for which Squal based cell reselection parameters are broadcast in system information, shall be performed based on the Squal criteria if the UE supports Squal (RSRQ) based cell reselection to E-UTRAN from all the other RATs provided by system information which UE supports. Otherwise, cell reselection to another RAT shall be performed based on Srxlev criteria.

Now, Intra-frequency and equal priority inter-frequency Cell Reselection criteria will be described.

The cell-ranking criterion $R_s$ for serving cell and $R_n$ for neighbouring cells is defined by:

$$R_s = Q_{meas,s} + Q_{Hyst}$$

$$R_n = Q_{meas,n} - Q\text{Offset} \qquad [\text{Equation 2}]$$

TABLE 2

| | |
|---|---|
| $Q_{meas}$ | RSRP measurement quantity used in cell reselections. |
| Qoffset | For intra-frequency: Equals to $Qoffset_{s,\ n}$, if $Qoffset_{s,\ n}$ is valid, otherwise this equals to zero. For inter-frequency: Equals to $Qoffset_{s,\ n}$ plus $Qoffset_{frequency}$, if $Qoffset_{s,\ n}$ is valid, otherwise this equals to $Qoffset_{frequency}$. |

The UE shall perform ranking of all cells that fulfil the cell selection criterion S, but may exclude all CSG cells that are known by the UE to be not allowed.

The cells shall be ranked according to the R criteria specified above, deriving $Q_{meas,n}$ and $Q_{meas,s}$ and calculating the R values using averaged RSRP results.

If a cell is ranked as the best cell the UE shall perform cell reselection to that cell. If this cell is found to be not-suitable, the UE shall behave the above-discussed operations.

In all cases, the UE shall reselect the new cell, only if the following conditions are met:

the new cell is better ranked than the serving cell during a time interval $Treselection_{RAT}$;

more than 1 second has elapsed since the UE camped on the current serving cell.

Now, cell reselection parameters broadcasted in system information will be discussed.

Cell reselection parameters are broadcast in system information and are read from the serving cell as follows:

TABLE 3

| Parameter | Description |
| --- | --- |
| cellReselectionPriority | This specifies the absolute priority for E-UTRAN frequeny or UTRAN frequency or group of GERAN frequencies or band class of CDMA2000 HRPD or band class of CDMA2000 1xRTT. |
| $Qoffset_{s, n}$ | This specifies the offset between the two cells. |
| $Qoffset_{frequency}$ | Frequency specific offset for equal priority E-UTRAN frequencies. |
| $Q_{hyst}$ | This specifies the hysteresis value for ranking criteria. |
| $Q_{qualmin}$ | This specifies the minimum required quality level in the cell in dB. |
| $Q_{rxlevmin}$ | This specifies the minimum required Rx level in the cell in dBm. |
| $Treselection_{RAT}$ | This specifies the cell reselection timer value. For each target E-UTRA frequency and for each RAT (other than E-UTRA) a specific value for the cell reselection timer is defined, which is applicable when evaluating reselection within E-UTRAN or towards other RAT (i.e. $Treselection_{RAT}$ for E-UTRAN is $Treselection_{EUTRA}$, for UTRAN $Treselection_{UTRA}$ for GERAN $Treselection_{GERA}$, for $Treselection_{CDMA\_HRPD}$, and for $Treselection_{CDMA\_1xRTT}$). |
| $Thresh_{X, HighP}$ | This specifies the Srxlev threshold (in dB) used by the UE when reselecting towards a higher priority RAT/frequency than the current serving frequency. |
| $Thresh_{X, HighQ}$ | This specifies the Squal threshold (in dB) used by the UE when reselecting towards a higher priority RAT/frequency than the current serving frequency. |
| $Thresh_{X, LowP}$ | This specifies the Srxlev threshold (in dB) used by the UE when reselecting towards a lower priority RAT/frequency than the current serving frequency. |
| $Thresh_{X, LowQ}$ | This specifies the Squal threshold (in dB) used by the UE when reselecting towards a lower priority RAT/frequency than the current serving frequency. |
| $Thresh_{Serving, LowP}$ | This specifies the Srxlev threshold (in dB) used by the UE on the serving cell when reselecting towards a lower priority RAT/frequency. |
| $Thresh_{Serving, LowQ}$ | This specifies the Squal threshold (in dB) used by the UE on the serving cell when reselecting towards a lower priority RAT/frequency. |
| $S_{IntraSearchP}$ | This specifies the Srxlev threshold (in dB) for intra-frequency measurements. |
| $S_{IntraSearchQ}$ | This specifies the Squal threshold (in dB) for intra-frequency measurements. |
| $S_{nonIntraSearchP}$ | This specifies the Srxlev threshold (in dB) for E-UTRAN inter-frequency and inter-RAT measurements. |
| $S_{nonIntraSearchQ}$ | This specifies the Squal threshold (in dB) for E-UTRAN inter-frequency and inter-RAT measurements. |

Below table 4 shows speed dependent reselection parameters described above. The mobility state of the UE may be estimated based on the speed dependent reselection parameters, and the speed dependent scaling rules may be applied based on the mobility state of the UE.

TABLE 4

| Parameter | Description |
| --- | --- |
| $T_{CRmax}$ | This specifies the duration for evaluating allowed amount of cell reselection(s). |
| $N_{CR\_M}$ | This specifies the maximum number of cell reselections to enter Medium-mobility state. |
| $N_{CR\_H}$ | This specifies the maximum number of cell reselections to enter High-mobility state. |
| $T_{CRmaxHyst}$ | This specifies the additional time period before the UE can enter Normal-mobility state. |
| Speed dependent ScalingFactor for Qhyst | This specifies scaling factor for Qhyst in sf-High for High-mobility state and sf-Medium for Medium-mobility state. |
| Speed dependent ScalingFactor for $Treselection_{EUTRA}$ | This specifies scaling factor for $Treselection_{EUTRA}$ in sf-High for High-mobility state and sf-Medium for Medium-mobility state. |

Now, cell reselection with CSG cells will be discussed.

Firstly, cell reselection from a non-CSG cell to a CSG cell is explained as follows:

In addition to normal cell reselection, the UE shall use an autonomous search function to detect at least previously visited allowed CSG cells on non-serving frequencies, including inter-RAT frequencies, according to the performance requirements specified in [10], when at least one CSG ID with associated PLMN identity is included in the UE's CSG whitelist. The UE may also use autonomous search on the serving frequency. The UE shall disable the autonomous search function for CSG cells if the UE's CSG whitelist is empty.

The UE autonomous search function, per UE implementation, determines when and/or where to search for allowed CSG cells.

If the UE detects one or more suitable CSG cells on different frequencies, then the UE shall reselect to one of the detected cells irrespective of the frequency priority of the cell the UE is currently camped on, if the concerned CSG cell is the highest ranked cell on that frequency.

If the UE detects a suitable CSG cell on the same frequency, it shall reselect to this cell as per normal reselection rules.

If the UE detects one or more suitable CSG cells on another RAT, the UE shall reselect to one of them.

Secondly, cell reselection from a CSG cell is explained as follows:

While camped on a suitable CSG cell, the UE shall apply the normal cell reselection rules.

To search for suitable CSG cells on non-serving frequencies, the UE may use an autonomous search function. If the UE detects a CSG cell on a non-serving frequency, the UE may reselect to the detected CSG cell if it is the highest ranked cell on its frequency.

If the UE detects one or more suitable CSG cells on another RAT, the UE may reselect to one of them.

Thirdly, cell reselection with Hybrid cells is explained as follows:

In addition to normal cell reselection rules, the UE shall use an autonomous search function to detect at least previously visited hybrid cells whose CSG ID and associated PLMN identity is in the UE's CSG whitelist according to the performance requirements. The UE shall treat detected hybrid cells as CSG cells if the CSG ID and associated PLMN identity of the hybrid cell is in the UE's CSG whitelist and as normal cells otherwise.

Figure 7A:
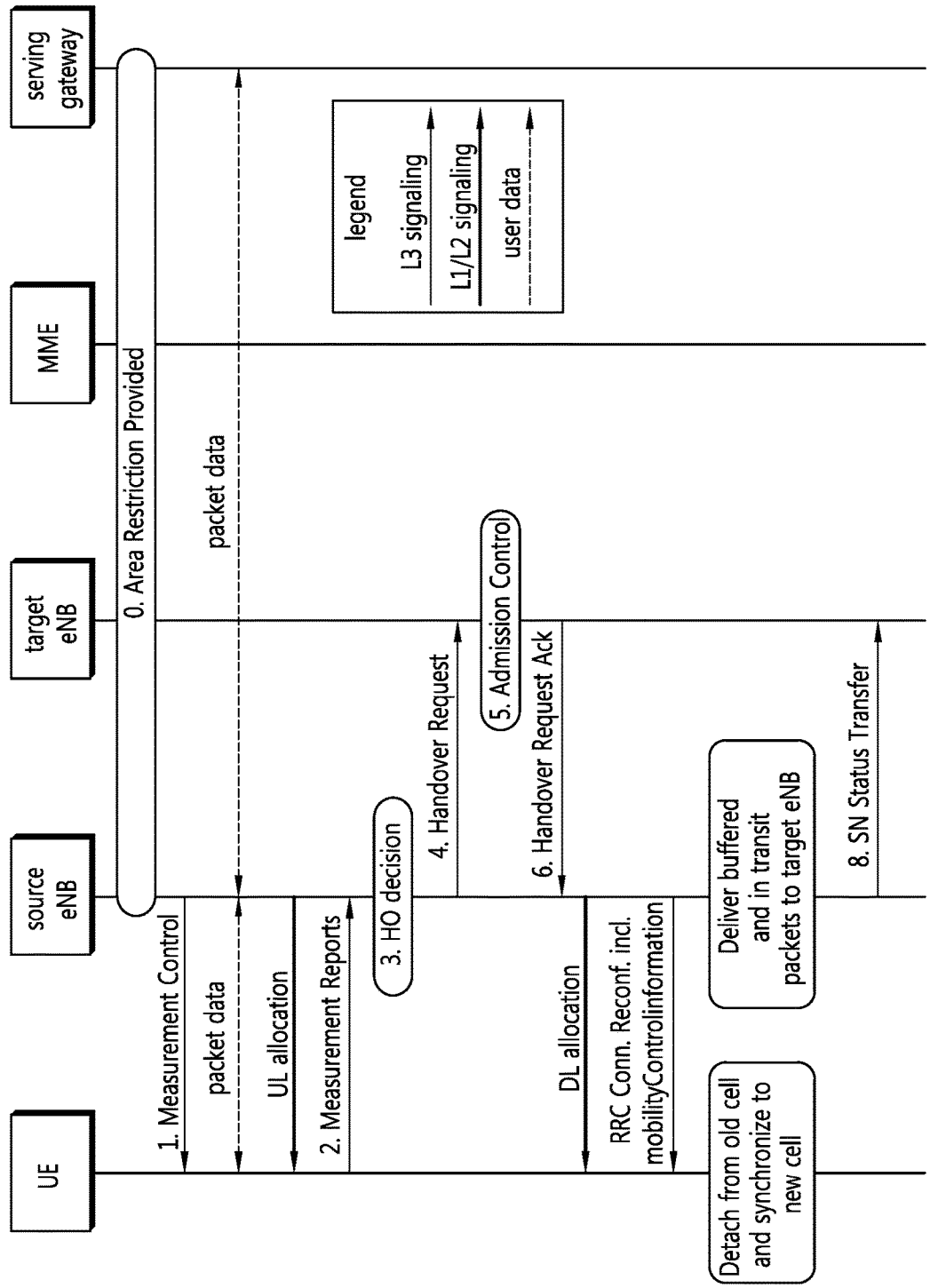

FIG. 7 shows an intra-MME/serving gateway handover procedure.

The intra E-UTRAN HO of a UE in RRC_CONNECTED state is a UE-assisted network-controlled HO, with HO preparation signalling in E-UTRAN:

Part of the HO command comes from the target eNB and is transparently forwarded to the UE by the source eNB;

To prepare the HO, the source eNB passes all necessary information to the target eNB (e.g. E-RAB attributes and RRC context):

When CA is configured and to enable SCell selection in the target eNB, the source eNB can provide in decreasing order of radio quality a list of the best cells and optionally measurement result of the cells.

Both the source eNB and UE keep some context (e.g. C-RNTI) to enable the return of the UE in case of HO failure;

UE accesses the target cell via RACH following a contention-free procedure using a dedicated RACH preamble or following a contention-based procedure if dedicated RACH preambles are not available:

The UE uses the dedicated preamble until the handover procedure is finished (successfully or unsuccessfully);

If the RACH procedure towards the target cell is not successful within a certain time, the UE initiates radio link failure recovery using a suitable cell;

No ROHC context is transferred at handover;

ROHC context can be kept at handover within the same eNB.

The preparation and execution phase of the HO procedure is performed without EPC involvement, i.e. preparation messages are directly exchanged between the eNBs. The release of the resources at the source side during the HO completion phase is triggered by the eNB. In case an RN is involved, its DeNB relays the appropriate S1 messages between the RN and the MME (S1-based handover) and X2 messages between the RN and target eNB (X2-based handover); the DeNB is explicitly aware of a UE attached to the RN due to the S1 proxy and X2 proxy functionality.

Now, referring to FIG. 6, the basic handover scenario where neither MME nor Serving Gateway will be explained.

Step 0) The UE context within the source eNB contains information regarding roaming restrictions which were provided either at connection establishment or at the last TA update.

Step 1) The source eNB configures the UE measurement procedures according to the area restriction information. Measurements provided by the source eNB may assist the function controlling the UE's connection mobility.

Step 2) A MEASUREMENT REPORT is triggered and sent to the eNB.

Step 3) The source eNB makes decision based on MEASUREMENT REPORT and RRM information to hand off the UE.

Step 4) The source eNB issues a HANDOVER REQUEST message to the target eNB passing necessary information to prepare the HO at the target side (UE X2 signalling context reference at source eNB, UE S1 EPC signalling context reference, target cell ID, KeNB*, RRC context including the C-RNTI of the UE in the source eNB, AS-configuration, E-RAB context and physical layer ID of the source cell+short MAC-I for possible RLF recovery). UE X2/UE S1 signalling references enable the target eNB to address the source eNB and the EPC. The E-RAB context includes necessary RNL and TNL addressing information, and QoS profiles of the E-RABs.

Step 5) Admission Control may be performed by the target eNB dependent on the received E-RAB QoS information to increase the likelihood of a successful HO, if the resources can be granted by target eNB. The target eNB configures the required resources according to the received E-RAB QoS information and reserves a C-RNTI and optionally a RACH preamble. The AS-configuration to be used in the target cell can either be specified independently (i.e. an "establishment") or as a delta compared to the AS-configuration used in the source cell (i.e. a "reconfiguration").

Step 6) The target eNB prepares HO with L1/L2 and sends the HANDOVER REQUEST ACKNOWLEDGE to the source eNB. The HANDOVER REQUEST ACKNOWLEDGE message includes a transparent container to be sent to the UE as an RRC message to perform the handover. The container includes a new C-RNTI, target eNB security algorithm identifiers for the selected security algorithms, may include a dedicated RACH preamble, and possibly some other parameters i.e. access parameters, SIBs, etc. The HANDOVER REQUEST ACKNOWLEDGE message may also include RNL/TNL information for the forwarding tunnels, if necessary.

As soon as the source eNB receives the HANDOVER REQUEST ACKNOWLEDGE, or as soon as the transmission of the handover command is initiated in the downlink, data forwarding may be initiated.

Step 7) The target eNB generates the RRC message to perform the handover, i.e RRCConnectionReconfiguration message including the mobilityControlInformation, to be sent by the source eNB towards the UE. The source eNB performs the necessary integrity protection and ciphering of the message. The UE receives the RRCConnectionReconfiguration message with necessary parameters (i.e. new C-RNTI, target eNB security algorithm identifiers, and optionally dedicated RACH preamble, target eNB SIBs, etc.) and is commanded by the source eNB to perform the HO. The UE does not need to delay the handover execution for delivering the HARQ/ARQ responses to source eNB.

Step 8) The source eNB sends the SN STATUS TRANSFER message to the target eNB to convey the uplink PDCP SN receiver status and the downlink PDCP SN transmitter status of E-RABs for which PDCP status preservation applies (i.e. for RLC AM). The uplink PDCP SN receiver status includes at least the PDCP SN of the first missing UL SDU and may include a bit map of the receive status of the out of sequence UL SDUs that the UE needs to retransmit in the target cell, if there are any such SDUs. The downlink PDCP SN transmitter status indicates the next PDCP SN that the target eNB shall assign to new SDUs, not having a PDCP SN yet. The source eNB may omit sending this message if none of the E-RABs of the UE shall be treated with PDCP status preservation.

Step 9) After receiving the RRCConnectionReconfiguration message including the mobilityControlInformation, UE performs synchronisation to target eNB and accesses the target cell via RACH, following a contention-free procedure if a dedicated RACH preamble was indicated in the mobilityControlInformation, or following a contention-based procedure if no dedicated preamble was indicated. UE derives target eNB specific keys and configures the selected security algorithms to be used in the target cell.

Step 10) The target eNB responds with UL allocation and timing advance.

Step 11) When the UE has successfully accessed the target cell, the UE sends the RRCConnectionReconfigurationComplete message (C-RNTI) to confirm the handover, along with an uplink Buffer Status Report, whenever possible, to the target eNB to indicate that the handover procedure is completed for the UE. The target eNB verifies the C-RNTI sent in the RRCConnectionReconfigurationComplete message. The target eNB can now begin sending data to the UE.

Step 12) The target eNB sends a PATH SWITCH REQUEST message to MME to inform that the UE has changed cell.

Step 13) The MME sends a MODIFY BEARER REQUEST message to the Serving Gateway.

Step 14) The Serving Gateway switches the downlink data path to the target side. The Serving gateway sends one or more "end marker" packets on the old path to the source eNB and then can release any U-plane/TNL resources towards the source eNB.

Step 15) The Serving Gateway sends a MODIFY BEARER RESPONSE message to MME.

Step 16) The MME confirms the PATH SWITCH REQUEST message with the PATH SWITCH REQUEST ACKNOWLEDGE message.

Step 17) By sending the UE CONTEXT RELEASE message, the target eNB informs success of HO to source eNB and triggers the release of resources by the source eNB. The target eNB sends this message after the PATH SWITCH REQUEST ACKNOWLEDGE message is received from the MME.

Step 18) Upon reception of the UE CONTEXT RELEASE message, the source eNB can release radio and C-plane related resources associated to the UE context. Any ongoing data forwarding may continue.

When an X2 handover is used involving HeNBs and when the source HeNB is connected to a HeNB GW, a UE CONTEXT RELEASE REQUEST message including an explicit GW Context Release Indication is sent by the source HeNB, in order to indicate that the HeNB GW may release of all the resources related to the UE context.

Now, U-plane handling will be explained below.

The U-plane handling during the Intra-E-UTRAN-Access mobility activity for UEs in ECM-CONNECTED takes the following principles into account to avoid data loss during HO:

During HO preparation U-plane tunnels can be established between the source eNB and the target eNB. There is one tunnel established for uplink data forwarding and another one for downlink data forwarding for each E-RAB for which data forwarding is applied. In the case of a UE under an RN performing handover, forwarding tunnels can be established between the RN and the target eNB via the DeNB.

During HO execution, user data can be forwarded from the source eNB to the target eNB. The forwarding may take place in a service and deployment dependent and implementation specific way.

Forwarding of downlink user data from the source to the target eNB should take place in order as long as packets are received at the source eNB from the EPC or the source eNB buffer has not been emptied.

During HO completion:

The target eNB sends a PATH SWITCH message to MME to inform that the UE has gained access and MME sends a MODIFY BEARER REQUEST message to the Serving Gateway, the U-plane path is switched by the Serving Gateway from the source eNB to the target eNB.

The source eNB should continue forwarding of U-plane data as long as packets are received at the source eNB from the Serving Gateway or the source eNB buffer has not been emptied.

For RLC-AM bearers:

During normal HO not involving Full Configuration:

For in-sequence delivery and duplication avoidance, PDCP SN is maintained on a bearer basis and the source eNB informs the target eNB about the next DL PDCP SN to allocate to a packet which does not have a PDCP sequence number yet (either from source eNB or from the Serving Gateway).

For security synchronisation, HFN is also maintained and the source eNB provides to the target one reference HFN for the UL and one for the DL i.e. HFN and corresponding SN.

In both the UE and the target eNB, a window-based mechanism is needed for duplication detection.

The occurrence of duplicates over the air interface in the target eNB is minimised by means of PDCP SN based reporting at the target eNB by the UE. In uplink, the reporting is optionally configured on a bearer basis by the eNB and the UE should first start by transmitting those reports when granted resources in the target eNB. In downlink, the eNB is free to decide when and for which bearers a report is sent and the UE does not wait for the report to resume uplink transmission.

The target eNB re-transmits and prioritizes all downlink PDCP SDUs forwarded by the source eNB (i.e. the target eNB should send data with PDCP SNs from X2 before sending data from S1), with the exception of PDCP SDUs of which the reception was acknowledged through PDCP SN based reporting by the UE.

The UE re-transmits in the target eNB all uplink PDCP SDUs starting from the first PDCP SDU following the last consecutively confirmed PDCP SDU i.e. the oldest PDCP SDU that has not been acknowledged at RLC in the source, excluding the PDCP SDUs of which the reception was acknowledged through PDCP SN based reporting by the target.

During HO involving Full Configuration:

The following description below for RLC-UM bearers also applies for RLC-AM bearers. Data loss may happen.

For RLC-UM bearers:

The PDCP SN and HFN are reset in the target eNB.

No PDCP SDUs are retransmitted in the target eNB.

The target eNB prioritizes all downlink PDCP SDUs forwarded by the source eNB if any (i.e. the target eNB should send data with PDCP SNs from X2 before sending data from S1).

The UE PDCP entity does not attempt to retransmit any PDCP SDU in the target cell for which transmission had been completed in the source cell. Instead UE PDCP entity starts the transmission with other PDCP SDUs.

Figure 8:
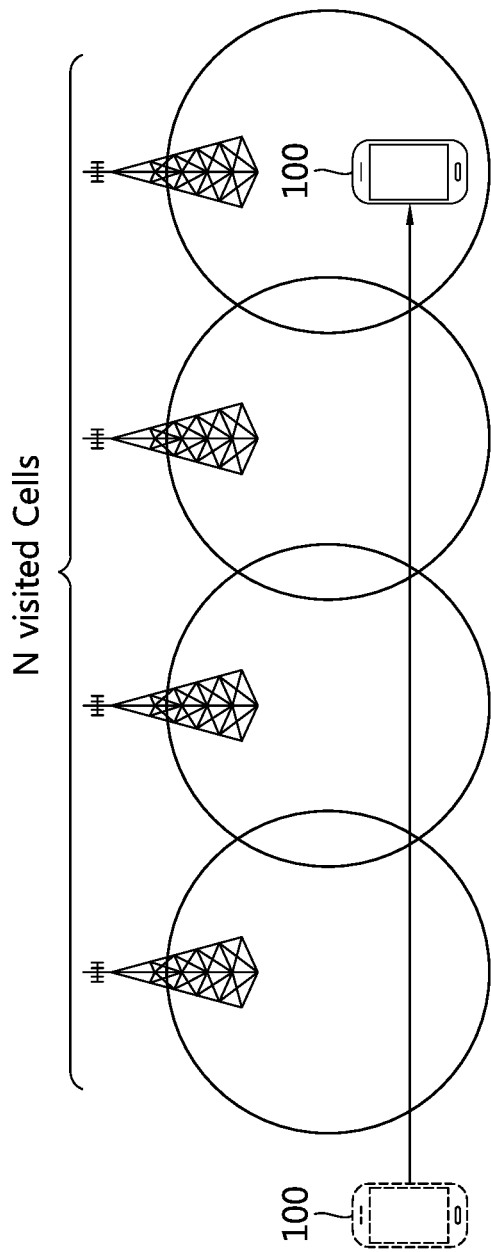
FIG. 8 is an exemplary situation where UE performs cell selection/reselection procedures for plural cells.

FIG. 8 is an exemplary situation where UE performs cell selection/reselection procedures for plural cells.

As shown in FIG. 8, if the UE in idle mode moves through the plurality of cells in very fast speed, the UE performs selection/reselection procedures.

Under this situation, there is a need for the network to estimate UE speed. Therefore, the present invention allows the UE to log visited cell history that is accumulated information on visited cells and then provide the visited cell history to the network at or after RRC connection setup to help the network estimate the UE's speed. The network may calculates the UE's speed based on the visited cell history and then set parameters of the UE based on the UE's speed.

But, too much information may be unhelpful or ineffective for the network to estimate the UE speed. That is to say, some visited cell information may be unhelpful for the network to estimate the UE speed. Here, it is unclear what information is helpful for the network to estimate the UE speed and what information is unhelpful for the network to estimate the UE speed. For example, the time information that the UE spent in the visited cell may be helpful.

So the visited cell information is needed to be checked whether it is vailed or not.

Therefore, the present disclosure provides solutions. For example, according to one example solution, if the UE a request about a visited cell history, then the UE transmit in response to the request, the visited cell history including an identifier of a visited cell, and time information corresponding to the visited cell. To transmit the visited cell history, whenever the UE performs a cell selection procedure or a handover procedure, the UE may accumulates the visited cell history. Here, the UE may check whether the visited cell history is valid or not. Therefore, when UE is requested to send the visited cell history by network, the UE sends only valid visited cell information. If network requested to UE to report N visited cell information, the UE may report valid N visited cell information to the network. Or, if the UE has less valid visited cell information than N, the UE reports all valid visited cell information to the network.

The visited cell information is considered as invalid information if the following condition is met:

a) if the time that UE stayed in the corresponding cell is less than a threshold time.

b) if the elapsed time since UE logged the visited cell information exceeds time threshold-1.

c) if the visited cell history comprises discontinuous visited cell information, if the gap between two logged times of valid visited cell information exceeds time threshold-2.

Now, the solutions will be explained below in more detail

Figure 9:
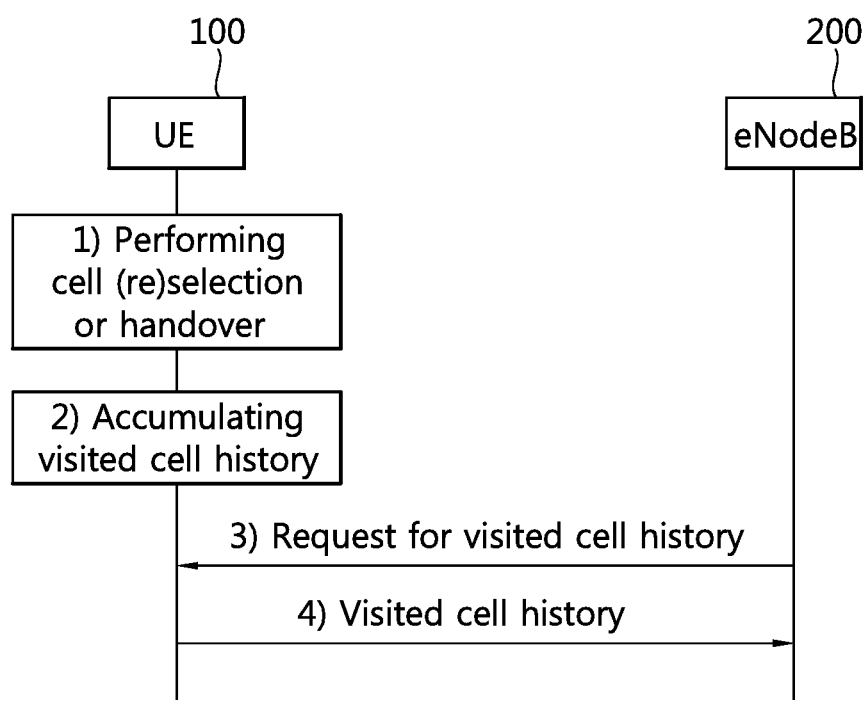
FIG. 9 is an exemplary solution according the present invention.

FIG. 9 is an exemplary solution according the present invention.

Step 1) UE performs a cell (re)selection procedure in IDLE state or a handover procedure or CONNECTED state.

Step 2) Then, the UE accumulates a visited cell history. Here, the UE performs a validity check on the visited cell information of the previous selected/serving cell.

The visited cell information may be considered invalid for logging if the time that UE stayed in the previous selected/serving cell is less than a threshold time. The threshold time for validity may be set by network. Or it is pre-set value and the UE know the value without a network signal.

Or, the visited cell information may be considered invalid for logging if UE has visited current selected/serving cell before in the past N cell re-selection/handover. The N is a threshold value to avoid logging ping-pong. For example, when the threshold N is 2, the UE selected cell A and then selected cell B, and then selected cell A again. In this case, the previously visited cell information about cell B is invalid. Because the UE has visited current selected cell, cell A, in the past 2 re-selection. Desirably, the threshold N may be 2.

If the visited cell information is valid, UE updates the visited cell history by adding the visited cell information of the previous selected cell/serving cell to the visited cell history. The UE logs the selected PLMN of the selected cell/serving cell and the logging time along with the visited cell information. If the visited cell information is invalid, UE doesn't update the visited cell history.

Step 3) When UE is requested to send the visited cell history by network, the UE performs the reporting validity check for each visited cell information that composes the visited cell history.

The visited cell information may be considered invalid for reporting if the elapsed time since UE logged the visited cell information exceeds time threshold-1.

The visited cell information may be considered invalid for reporting if the visited cell history comprises discontinuous visited cell information and if the gap between two logged times of valid visited cell information exceeds time threshold-2. Here, the discontinuous visited cell information means that a visited cell information is updated but the previous visited cell information is not about the previous visited cell because the visited cell information about the previous visited cell is invalid for logging.

The time threshold 1 and 2 are pre-set value, so UE knows these value without signaling from network. Or network can signal these values to UE.

Step 4) The UE sends the visited cell history except invalid visited cell information to the serving cell. It is noted that the reporting validity check can be done before receiving the request for visited cell history reporting, i.e. upon completing the RRC connection setup procedure.

The visited cell history may include a number of visited cell information.

The number of visited cell information is pre-set value or set by the network.

The visited cell information includes at least one or more of the following:
  Global Cell ID, and/or
  Physical Cell ID, and/or
  Cell Type, and/or
  Time that UE stayed in the cell, and/or
  Time that UE selected the cell by performing cell re-selection procedure, and/or
  Time that UE is handed over to the cell by performing handover procedure, and/or
  Handover cause value.
  Downlink carrier frequency of the cell Here, if the UE acquires the global cell ID, the visited cell information includes the global cell ID. However, if the UE does not acquire the global cell ID, the visited cell information includes the physical cell ID and the downlink carrier frequency of the cell.

The ways or methods to solve the problem of the related art according to the present disclosure, as described so far, can be implemented by hardware or software, or any combination thereof.

Figure 10:
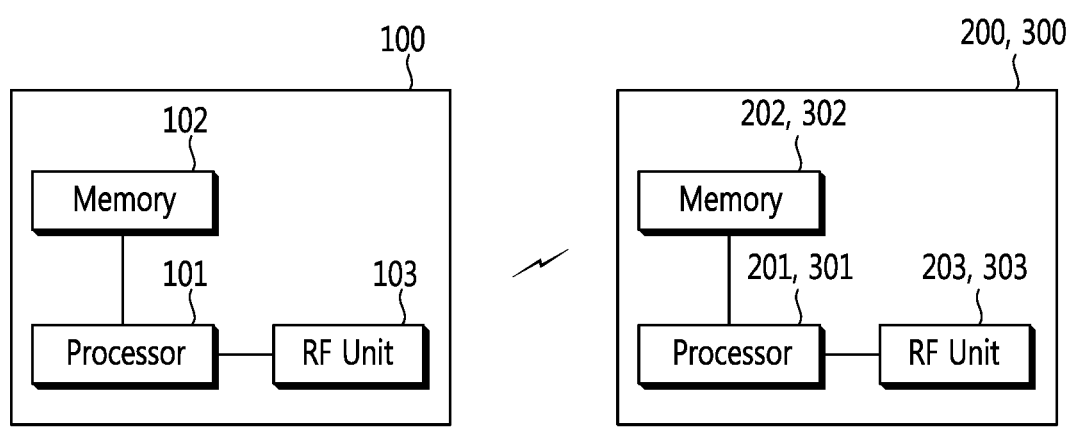
FIG. 10 is a block diagram showing a wireless communication system to implement an embodiment of the present invention.

FIG. 10 is a block diagram showing a wireless communication system to implement an embodiment of the present invention.

An UE 100 includes a processor 101, memory 102, and a radio frequency (RF) unit 103. The memory 102 is connected to the processor 101 and configured to store various information used for the operations for the processor 101. The RF unit 103 is connected to the processor 101 and configured to send and/or receive a radio signal. The processor 101 implements the proposed functions, processed, and/or methods. In the described embodiments, the operation of the UE may be implemented by the processor 101.

The eNodeB 200 includes a processor 201, memory 202, and an RF unit 203. The memory 202 is connected to the processor 201 and configured to store various information used for the operations for the processor 201. The RF unit 203 is connected to the processor 201 and configured to send and/or receive a radio signal. The processor 201 implements the proposed functions, processed, and/or methods. In the described embodiments, the operation of the eNodeB may be implemented by the processor 201.

The processor may include Application-Specific Integrated Circuits (ASICs), other chipsets, logic circuits, and/or data processors. The memory may include Read-Only Memory (ROM), random access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for transmitting an uplink message, the method performed by a user equipment (UE) and comprising:
performing a handover procedure from a first cell to a second cell;
performing a validity check on cell information on the first cell;
adding the cell information of the first cell to a visited cell history, when the cell information on the first cell is valid,
wherein the visited cell history includes an accumulation of information on a cell history of valid cell information from information on visited cells;
receiving, by the UE, a request for the visited cell history; and
transmitting, by the UE, in response to the request, the visited cell history,
wherein the visited cell history includes time information corresponding to the first cell, frequency information corresponding to the first cell, and a physical cell identifier corresponding to the first cell, instead of a global cell identifier.

2. The method of claim 1, wherein the time information indicates a time duration that the UE spent in each visited cell identified by the physical cell identifier of each visited cell.

3. The method of claim 1, wherein the time information corresponding to the first cell includes at least one of:
a time that the UE stayed in the first cell;
a time that the UE selected the first cell by performing a cell re-selection procedure; and
a time that the UE is handed over to the first cell by performing the handover procedure.

4. The method of claim 1, further comprising:
storing, an accumulation of, the visited cell history whenever the UE performs a cell reselection procedure or a handover procedure.

5. The method of claim 1, further comprising:
checking whether the visited cell history is valid or invalid,
wherein the transmitting step comprises only transmitting valid visited cell history.

6. The method of claim 5, wherein
the UE determines that the visited cell history is invalid,
when the time that the UE stayed in a corresponding cell is less than a first threshold, or
when an elapsed time since the UE logged the cell information exceeds a second threshold.

7. A user equipment (UE) for transmitting an uplink message, the UE comprising:
a transceiver; and
a processor, operatively coupled to the transceiver,
wherein the processor is configured to:
control the transceiver to receive, by the UE, a request for a visited cell history;
control the transceiver to transmit, by the UE, in response to the request, the visited cell history;
perform a handover procedure from a first cell to a second cell;
perform a validity check on cell information on the first cell; and
add the cell information of the first cell to the visited cell history, when the cell information on the first cell is valid;
wherein the visited cell history includes an accumulation of information on a cell history of valid cell information from information on visited cells,
wherein the visited cell history includes time information corresponding to the first cell,
frequency information corresponding to the first cell, and
a physical cell identifier corresponding to the first cell, instead of a global cell identifier.

8. The UE of claim 7, wherein the time information indicates a time duration that the UE spent in each visited cell identified by the physical cell identifier of each visited cell.

9. The UE of claim 7, wherein when a time value exceeds a threshold, the time value is not included in the time information.

10. The UE of claim 7, wherein the processor is further configured to:
- check whether the visited cell history is valid or invalid, and
- control the transceiver to transmit only valid visited cell history.

11. The UE of claim 10, wherein
the UE determines that the visited history is invalid,
- when the time that the UE stayed in a corresponding cell is less than a first threshold, or
- when an elapsed time since the UE logged the cell information exceeds a second threshold.

* * * * *